(12) United States Patent
Lee et al.

(10) Patent No.: US 7,154,572 B2
(45) Date of Patent: Dec. 26, 2006

(54) LIQUID CRYSTAL DISPLAY DEVICE

(75) Inventors: Sang-Duk Lee, Yongin-si (KR);
Jung-Tae Kang, Suwon-si (KR);
Sang-Hee Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/401,305

(22) Filed: Mar. 26, 2003

(65) Prior Publication Data
US 2004/0051825 A1    Mar. 18, 2004

(30) Foreign Application Priority Data
Sep. 14, 2002  (KR) ............... 10-2002-0055975

(51) Int. Cl.
*G02F 1/1335* (2006.01)
*G09G 3/36* (2006.01)
*F21V 5/00* (2006.01)
*F21V 5/04* (2006.01)

(52) U.S. Cl. ............... 349/61; 349/64; 345/84; 362/333; 362/336; 362/337

(58) Field of Classification Search ............... 349/62, 349/61, 64; 345/84; 362/333, 336, 337
See application file for complete search history.

(56) References Cited

U.S. PATENT DOCUMENTS

| | | | | |
|---|---|---|---|---|
| 5,712,694 | A * | 1/1998 | Taira et al. | 349/9 |
| 5,783,299 | A * | 7/1998 | Miyashita et al. | 428/329 |
| 6,222,689 | B1 * | 4/2001 | Higuchi et al. | 359/837 |
| 6,339,501 | B1 * | 1/2002 | Kameyama et al. | 359/485 |
| 2003/0142249 | A1 * | 7/2003 | Fujimoto | 349/96 |
| 2003/0142250 | A1 * | 7/2003 | Kawahara et al. | 349/96 |

FOREIGN PATENT DOCUMENTS

JP    10096922    * 4/1998

* cited by examiner

*Primary Examiner*—Dung T. Nguyen
*Assistant Examiner*—Hoan C. Nguyen
(74) *Attorney, Agent, or Firm*—Cantor Colburn LLP

(57) ABSTRACT

An LCD device has scratch-resistant property without using a protection sheet and can provide enhanced brightness. The LCD device includes a light path regulating member. The member includes a first prism sheet having first prisms of which apex has a round shape. The first prism sheet concentrates light supplied from a lamp to output the concentrated light. An anti-glare polarizing plate uniformly polarizes polarized planes of the concentrated light and provides the polarized light to the lower substrate. The anti-glare polarizing plate is arranged below the lower substrate of an LCD panel, and an uppermost prism sheet of optical sheets is non-matte-treated and has round-treated apexes. In spite of the absence of the protection sheet, the scratch-resistant property of the uppermost prism sheet and the brightness of the LCD panel may be enhanced.

18 Claims, 6 Drawing Sheets

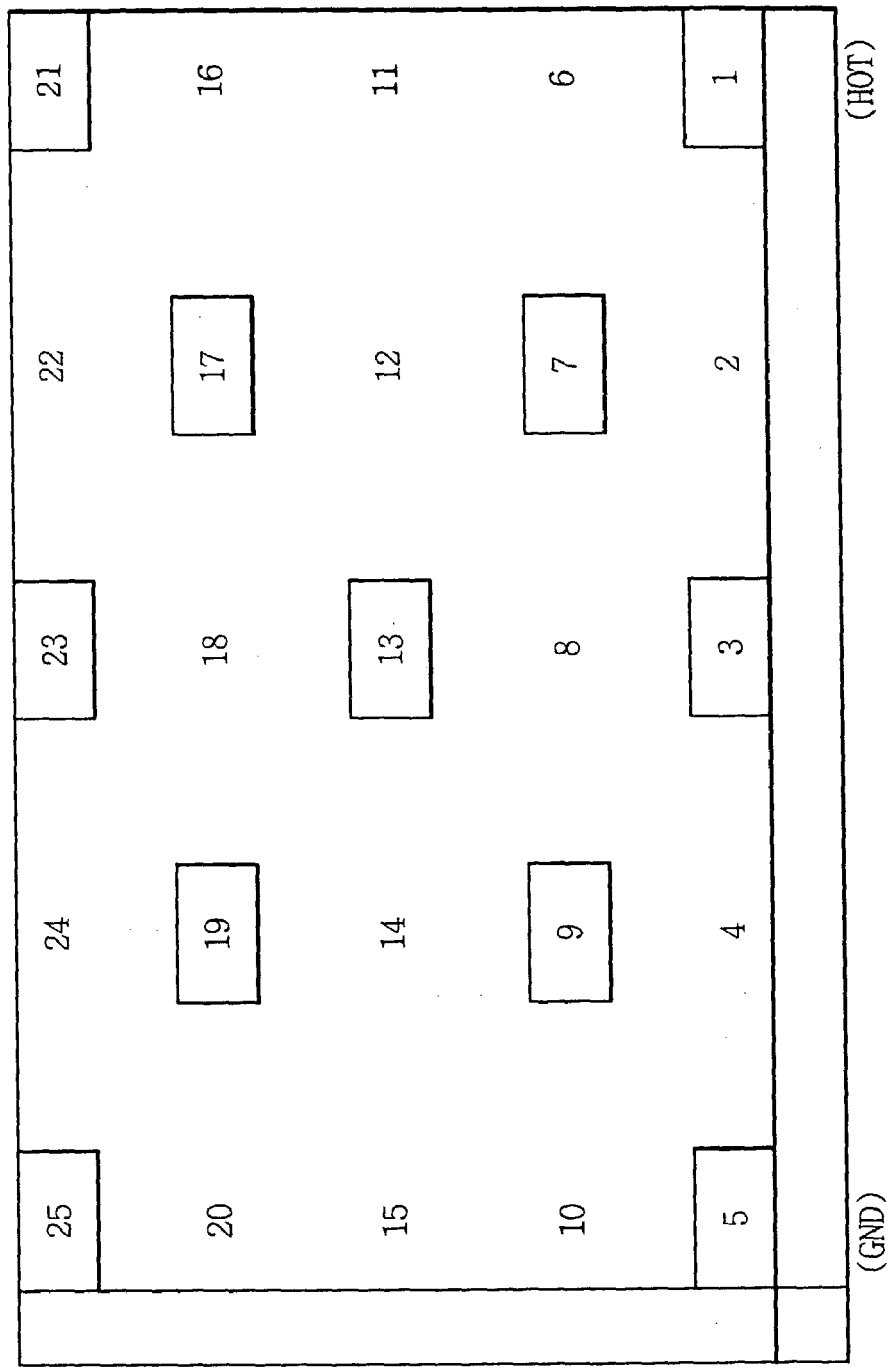

LIQUID CRYSTAL DISPLAY DEVICE

CROSS-REFERENCE TO RELATED APPLICATIONS

This application relies for priority upon Korean Patent Application No. 2002-55975 filed on Sep. 14, 2002, the contents of which are herein incorporated by reference in its entirety.

BACKGROUND OF THE INVENTION

1. Field of the Invention

The present invention relates to a liquid crystal display (LCD) device, and more particularly to a liquid crystal display device that has a strong resistance to scratches and has improved brightness in spite of the absence of a protection sheet in the backlight assembly of the liquid crystal display device.

2. Description of the Related Art

Generally, since liquid crystal does not emit light by itself, display devices employing the liquid crystal so as to display an image are provided with natural light from external light source to display an image, or the display devices have an internal light source such as a backlight assembly so as to display an image.

The backlight assembly includes a lamp unit for emitting light, a light guiding plate for guiding the light generated from the lamp unit toward an LCD panel, a reflecting plate (or reflector) that is disposed below the light guiding plate and reflects the light leaked from the light guiding plate back toward the light guiding plate, and optical sheets for enhancing the brightness distribution of the light transmitted from the light guiding plate. The optical sheets includes a diffusion sheet, a first prism sheet and a second prism sheet sequentially arranged on the light guiding plate, and the optical sheets improve the optical property of the light passing through the light guiding plate to output the optically improved light.

However, when all elements of the optical sheets are employed in the LCD device, the thickness of the backlight assembly of the LCD device or the LCD device employing the backlight assembly increases and manufacturing cost therefore increases.

SUMMARY OF THE INVENTION

Accordingly, the present invention is provided to substantially obviate one or more problems due to limitations and disadvantages of the related art.

It is a feature of the present invention to provide a LCD device having a reduced number of the optical sheets.

In one aspect of the present invention, there is provided a liquid crystal display device including a backlight assembly and a liquid crystal display panel assembly. The backlight assembly comprises a light path regulating means including a first prism sheet. The first prism sheet concentrates a first light supplied from an internal light source, regulates a light path of the first light and outputs a second light. The liquid crystal display panel assembly includes an anti-glare polarizing plate for uniformly polarizing a polarized plane of the second light. The liquid crystal display panel assembly displays an image based on the second light.

In another aspect of the present invention, there is provided a liquid crystal display device including a backlight assembly and a liquid crystal display panel assembly. The backlight assembly includes a lamp (or lamps) for generates a first light and a light path regulating means. The light path regulating means includes a first prism sheet having a plurality of first prisms formed on a first transparent film. An apex of each the first prisms has a round shape, and the first prism sheet concentrates a first light supplied from the lamp, regulates a light path of the first light and outputs a second light. The liquid crystal display panel assembly includes an upper substrate, a lower substrate facing the upper substrate, a liquid crystal layer interposed between the upper and lower substrates and an anti-glare polarizing plate. The anti-glare polarizing plate is arranged on a rear surface of the lower substrate, uniformly polarizes a polarized plane of the second light to provide the lower substrate with the polarized second light. The liquid crystal display panel assembly displays an image based on the second light. Alternatively, a front face of the anti-glare polarizing plate faces the lower substrate, and a rear face of the anti-glare polarizing plate is treated to have a predetermined haze value. The haze value is preferably in a range from about 12% to about 44%.

According to the liquid crystal display device of this invention, an anti-glare-treated polarizing plate is arranged below the lower substrate of the LCD panel and an uppermost prism sheet of the optical sheets is non-mat-treated and is also made to have a structure in which apex is round-treated. Accordingly, in spite of the absence of the protection sheet the scratch-resistant property of the uppermost prism sheet and the brightness may be enhanced.

As described above, according to the liquid crystal display device of this invention, the lower polarizing plate disposed below an LCD panel is replaced by a anti-glare polarizing plate which has a predetermined haze value, and the upper prism sheet of the two prism sheets disposed in the backlight assembly is replaced by a prism sheet which is not treated with matte and of which apex is round-treated. As a result, in spite of the absence of the protection sheet disposed between the LCD panel and the backlight assembly, the scratch-resistant property of the upper prism sheet arranged at the uppermost location of the backlight assembly, and the brightness of the LCD panel may be enhanced.

Further, since it is possible to reduce the danger of scratches that may occur during the assembly process of the LCD device and to prevent the brightness from being lowered, in spite of the absence of the protection sheet disposed between the LCD panel and the backlight assembly, the thickness and weight of the LCD device in spite of the absence of the protection sheet can be reduced compared with the LCD device having the protection sheet by the thickness and weight of the protection sheet, and manufacturing cost can be also reduced.

BRIEF DESCRIPTION OF THE DRAWINGS

The above and other features and advantages of the present invention will become more apparent by describing in detail the preferred embodiments thereof with reference to the accompanying drawings, in which:

FIG. 5A is a schematic view showing an effective display screen of a liquid crystal display device.

DESCRIPTION OF THE PREFERRED EMBODIMENTS

Figure 1:
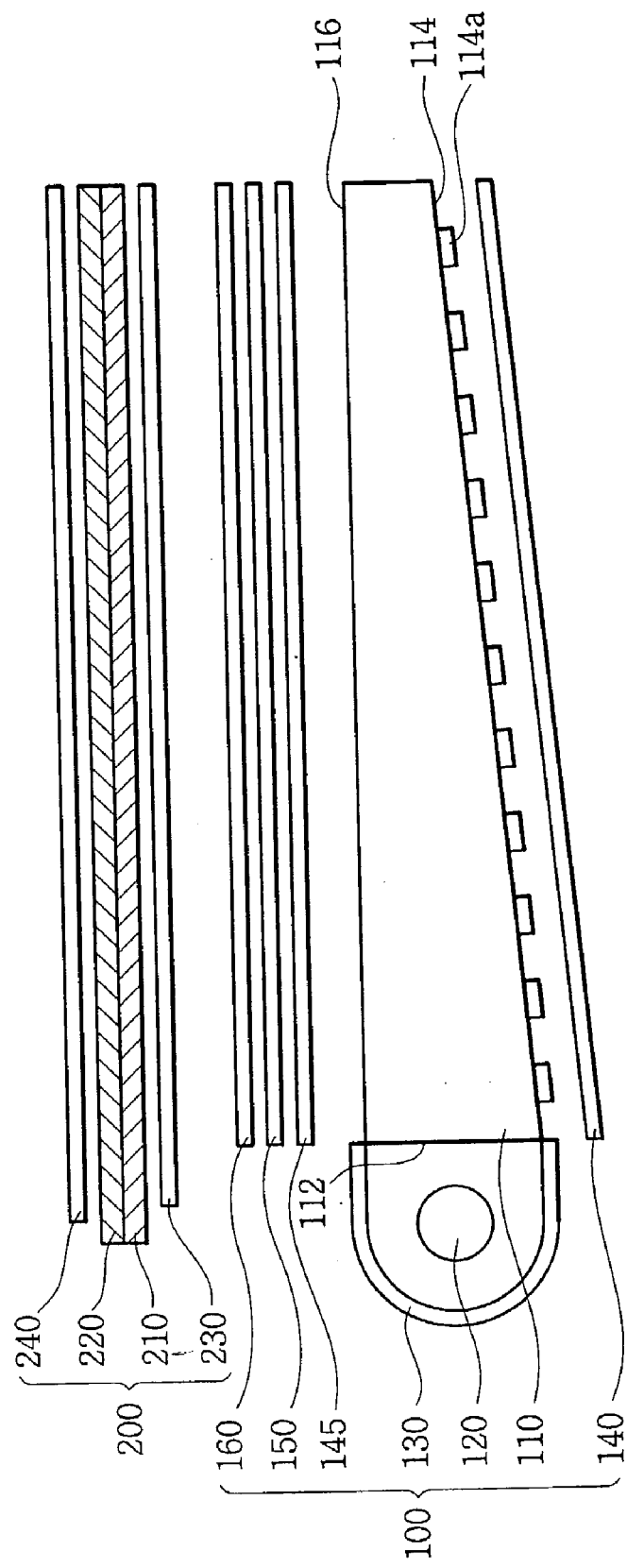
FIG. 1 is a schematic view showing a liquid crystal display device according to one exemplary embodiment of the present invention.

FIG. 1 is a schematic view showing a liquid crystal display device according to one exemplary embodiment of the present invention.

Referring to FIG. 1, a liquid crystal display device according to the present invention includes a backlight assembly 100 which converts a linear light into a planar light and outputs the converted planar light, and an LCD panel assembly 200 for displaying an image on the basis of the converted planar light.

The backlight assembly 100 includes a light guiding plate 110, a lamp 120, a lamp reflector 130, a reflection sheet 140, a first prism sheet 150 and a second prism sheet 160. The backlight assembly 100 converts the linear light generated from the lamp 120 into the planar light and outputs the converted planar light to the LCD panel assembly 200.

In more detail, the light guiding plate 110 includes a light incident surface 112 that is provided with the light generated from the lamp 120, a light reflective surface 114 conjoining with a first side of the light incident surface 112, and a light emitting surface 116 which conjoins with a second side of the light-incident surface 112 and outputs light. The light guiding plate 110 guides the light supplied from the lamp 120 to output the guided light to the first prism sheet 150. For example, the light reflective surface 114 has a plurality of fine dots 114a. Diffusive reflection occurs at the fine dots 114a when the light is irradiated onto the reflective surface 114. In another example, a size of the fine dot 114a increases substantially in proportion to a distance between each of the fine dots 114a and the lamp 120, and the density per unit area of the fine dots 114a increases substantially in inverse proportion to the distance between each of the fine dots 114a and the lamp 112.

The lamp 120 generates light in response to a power signal supplied from an external power source.

The lamp reflector 130 encloses the lamp 120 to be coupled to the light guiding plate 110, and blocks the leakage of the light outputted from the lamp 120. In other words, since the light supplied from the lamp 120 exits in a radial direction, the light that is not directly incident into the light guiding plate 110 is reflected by an inner surface of the lamp reflector 130 and is reflected back toward the light guiding plate 110.

The reflection sheet 140 is disposed below the light guiding plate 110 to reflect the light leaked through the light reflective surface 114 of the light guiding plate back toward the light guiding plate 110. In this embodiment, an LCD device has the separate reflection sheet 140 so as to reduce the leakage of the light through the light guiding plate 110. However, a film having a high reflectivity may be coated on a receiving container (not shown) so as to allow the coated film to further perform the function of the reflection sheet 140. The receiving container receives the light guiding plate 110, the lamp 120, the lamp reflector 130, the first prism sheet 150 and the second prism sheet 160.

The first prism sheet 150 has a plurality of first triangular prisms. The first triangular prisms are formed on a first transparent film to be arranged in a predetermined pattern. The first prism sheet 150 firstly concentrates the light outputted from the light guiding plate 110, and outputs the concentrated light to the second prism sheet 160.

The second prism sheet 160 has a plurality of second triangular prisms. The second triangular prisms are formed on a second transparent film to be arranged in a predetermined pattern. The second prism sheet 160 is disposed over the first prism sheet 160. The apexes of the second triangular prisms are round-treated or treated to have round apexes. The second prism sheet 160 receives the firstly concentrated light so as to secondly concentrate, and outputs the secondly concentrated light.

When the first prisms of the first prism sheet 150 are arranged in a first direction, the second prisms of the second prism sheet 160 are arranged in a second direction having a predetermined angle, for instance 90 degrees, with respect to the first direction. Therefore, the light outputted from the light guiding plate 110 can be concentrated in a lateral direction and in a longitudinal direction of the light guiding plate 110, to thereby provide a sufficient viewing angle.

In the aforementioned example, there is disclosed the LCD in which a plurality of fine dots are formed on the light reflective surface 112 of the light guiding plate 110 so as to allow the diffusive reflection of the guided light to occur. In another example, the light guiding plate 110 may further include a diffusion sheet 145 thereon. In still another example, the light reflective surface 112 of the light guiding plate 110 may be treated to have a mirror surface or a mirror-treated surface (a treated surface that is smooth or mirror-like), and a diffusive reflection member may be installed on the light emitting surface 116 of the light guiding plate 110. The diffusive reflection occurs at the diffusive reflection member. In still further another example, the light reflective surface 112 of the light guiding plate 110 may be mirror-treated, and the light guiding plate 110 may further include a diffusion sheet thereon.

The LCD panel assembly 200 includes a lower substrate 210 on which thin film transistor (TFT) switching devices are arranged in a matrix configuration, an upper substrate 220 on which red (R), green (G) and blue (B) color filters corresponding to the TFT switching devices are arranged, and a liquid crystal layer interposed between the lower substrate 210 and the upper substrate 220. The LCD panel assembly 200 displays an image in response to the light supplied from the backlight assembly 100. A detailed description of the LCD panel assembly 200 is omitted since the LCD panel assembly 200 is well known to those skilled in the art.

In addition, the LCD panel assembly 200 further includes an anti-glare polarizing plate 230 arranged on a rear surface of the lower substrate 210 and an upper polarizing plate 240 arranged on the upper substrate 220.

A rear face of the anti-glare polarizing plate 230 is treated to have an anti-glare surface or anti-glare-treated so that the rear surface of the anti-glare polarizing plate 230 have a predetermined haze value. As aforementioned, the anti-glare polarizing plate 230 is formed on a rear surface of the lower substrate 210, the light provided from the backlight assembly 100 is made to have an uniform polarized plane by the anti-glare polarizing plate 230, and the light having the uniform polarized plane is provided to the lower substrate 210. The anti-glare polarizing plate 230 may include a resin having various haze values, for example, 12%, 25%, 44%, etc, The anti-glare polarizing plate 230 polarizes the light provided from the backlight assembly 100 such that the uniform light is incident onto the lower substrate 210 of the LCD panel assembly 200.

The haze value (H) can be calculated by the following equation 1.

$$H = \frac{H_2}{H_1 + H_2} * 100 \, [\%], \qquad \text{<Equation 1>}$$

wherein, H1 is a brightness of, when light is incident onto the anti-glare polarizing plate 230, the light that passes through the anti-glare polarizing plate 230 in the same direction as the light incident direction, and H2 is a brightness of the light diffused by the anti-glare polarizing plate 230.

The upper polarizing plate 240 is arranged on the upper substrate 220, and the light that passes through the upper substrate 220 has a uniform polarized plane due to the presence of the upper polarizing plate 240, and the light having the uniform polarized plane exits outward the LCD panel assembly 200.

As described above, the anti-glare polarizing plate 230 that is treated to have a predetermined haze value is arranged on a rear surface of the lower substrate 210, thereby optical interference phenomenon, such as prism oil band or Moire phenomenon in a specific pattern occurring on display screen of the LCD panel, can be prevented.

When operation of the LCD panel assembly having the anti-glare polarizing plate is tested, it is desirable that the test is performed before the anti-glare polarizing plate is attached to the LCD panel assembly because a laser beam cannot be exactly focused on target portions of the LCD device to be repaired through the anti-glare polarizing plate during repair process of the LCD panel assembly.

Although the above exemplary embodiments discuss a backlight assembly having a wedge type light guiding plate which has lamp(s) at one side of the light guiding plate, a backlight assembly having a flat type light guiding plate which has lamp(s) at one side or at both side of the light guiding plate may also be utilized in place of the backlight assembly having the wedge type light guiding plate.

In addition, although the above exemplary embodiments discuss an edge type backlight assembly having lamp(s) at one side of the light guiding plate, a direct illuminating type backlight assembly or any other type backlight assembly known to one of the ordinary skill in the art may also be utilized in place of the edge type backlight assembly. In the direct illuminating type backlight assembly, the backlight assembly does not have a light guiding plate, and a plurality of lamps is arranged below the LCD panel.

Figure 2:
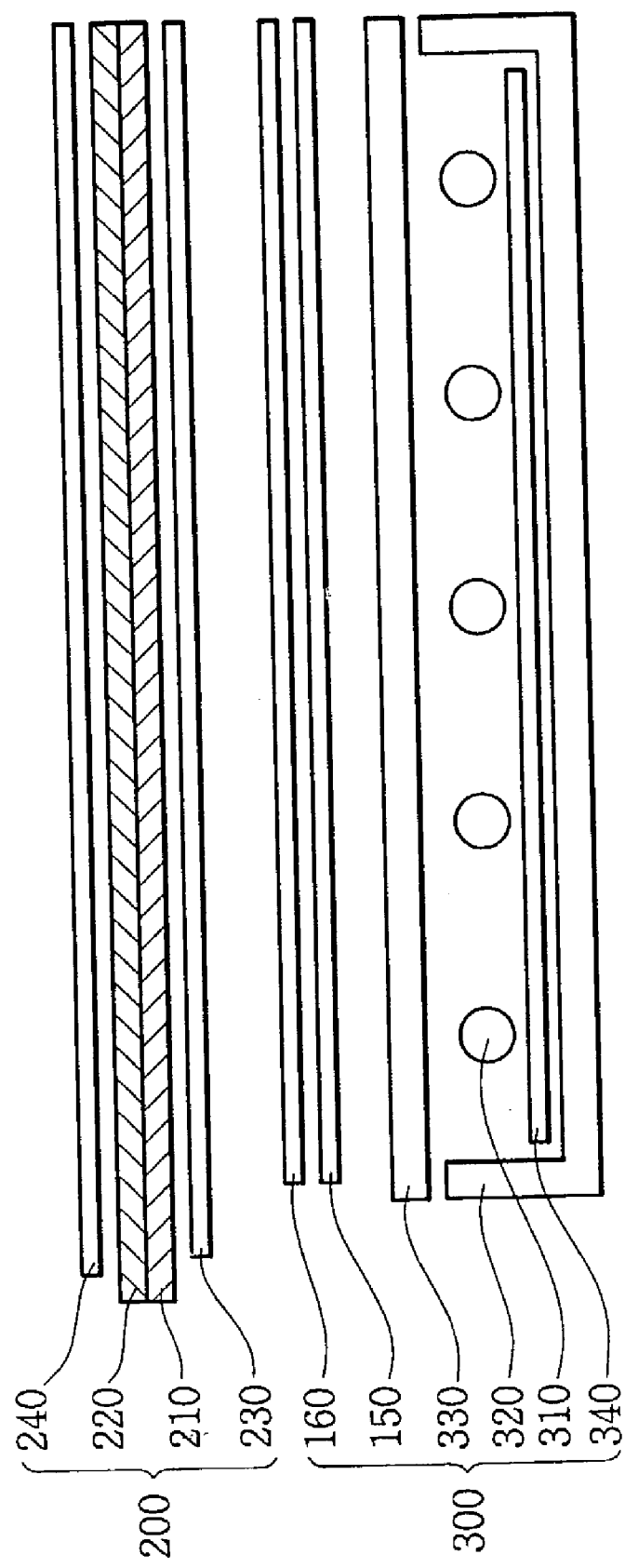
FIG. 2 is a schematic view showing a liquid crystal display device according to another exemplary embodiment of the present invention.

FIG. 2 is a schematic view showing a liquid crystal display device according to another exemplary embodiment of the present invention, especially shows the LCD device having the direct illuminating type backlight assembly. Referring now in specific detail to FIG. 2 in which the same reference numerals denote the same elements in FIG. 2, and thus any further detailed descriptions concerning the same elements will be omitted.

Referring to FIG. 2, a liquid crystal display device according to another exemplary embodiment of the present invention includes a backlight assembly 300 which converts a linear light into a planar light and outputs the converted planar light, and an LCD panel assembly 200 for displaying an image on the basis of the converted planar light.

The backlight assembly 300 includes a receiving container 310, lamps 320, a diffusion plate 330, a reflection sheet 340, a first prism sheet 150 and a second prism sheet 160. The backlight assembly 300 converts a linear light supplied from the lamps 320 into a planar light and outputs the converted planar light toward the LCD panel 400. The receiving container 310 provides a receiving space defined by a bottom face and a plurality of side walls. The lamps 320 are arranged in the receiving container 310 and radiate light, the diffusion plate 330 diffuses the light from the lamps 320. The refection sheet 340 is disposed on the bottom surface of the receiving container 319 and reflects the light supplied from the lamps 320. The first and the second prism sheets 150, 160 are installed on the diffusion plate 330 sequentially. Since the first and the second prism sheets 150, 160 described in FIG. 2 are the same as the first and the second prism sheets 150, 160 of FIG. 1, the first and the second prism sheets 150, 160 have the same reference numerals and will not be further described below to avoid a redundancy.

Although the embodiment of FIG. 2 describes that the backlight assembly has a reflection sheet 340, material having a high reflectivity may be coated on a bottom surface of the receiving container 310.

Since the LCD panel 200 is described in FIG. 2, and detailed description will not be further described below to avoid a redundancy.

Figure 3:
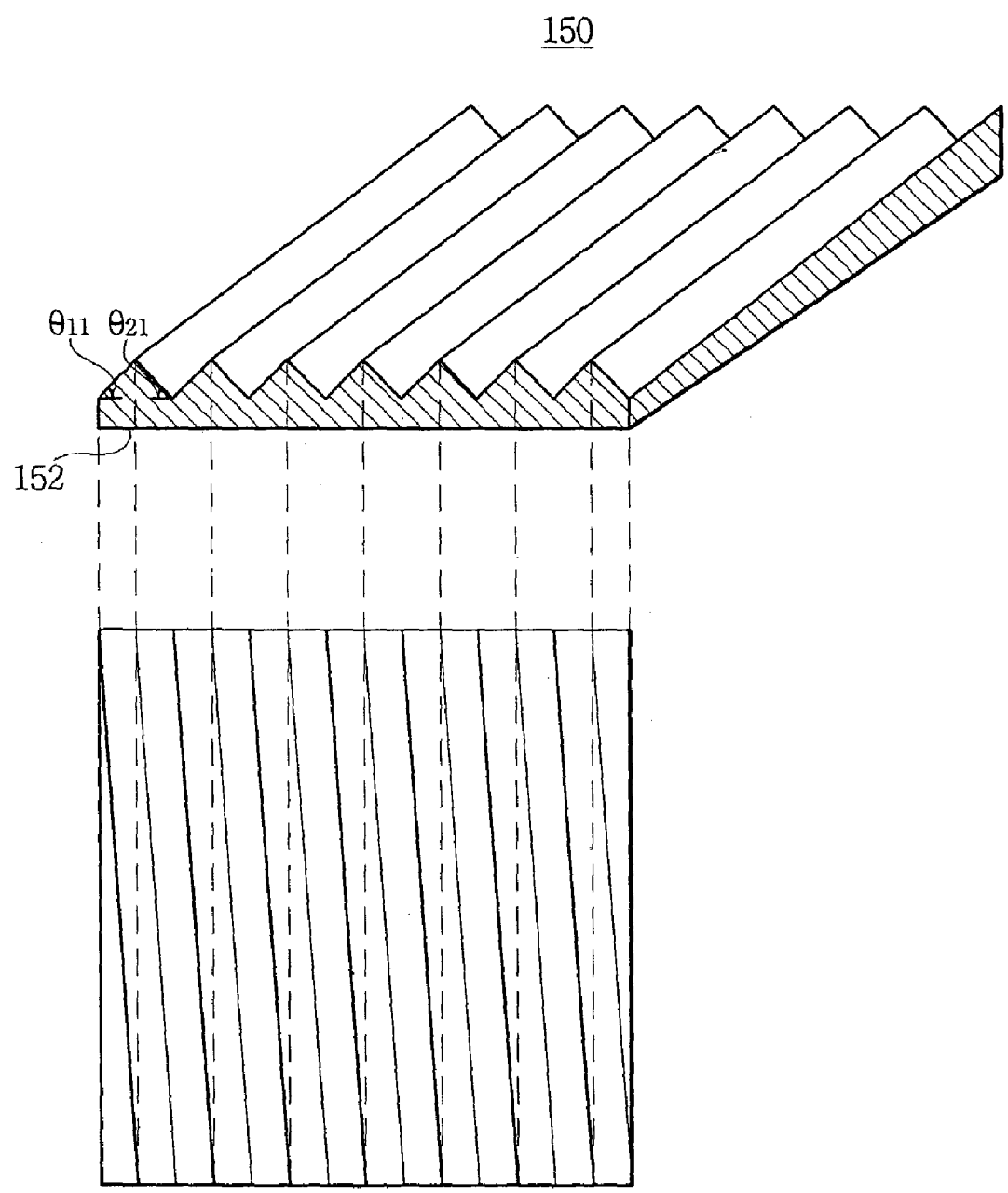
FIG. 3 is a schematic view showing the first prism sheet of FIG. 1.

FIG. 3 is a schematic view showing the first prism sheet of FIG. 1, especially shows a linear type prism sheet.

Referring to FIG. 3, the linear type prism sheet 150 has a plurality of triangular prisms arranged in parallel with each other on a first transparent film 152 having a predetermined thickness. Each of the triangular prisms includes a first oblique face and a second oblique face. A first oblique angle ($\theta 11$) between the bottom surface of the film 152 and the first oblique face may be equal to or different from a second oblique angle ($\theta 21$) between the bottom surface of the film 152 and the second oblique face. A first oblique angle in one triangular prism may be equal to or different from another first oblique angle in another triangular prism that is adjacent to the first triangular prism, and a second oblique angle in one triangular prism may be equal to or different from another second oblique angle in another triangular prism that is adjacent to the second triangular prism.

Figure 4:
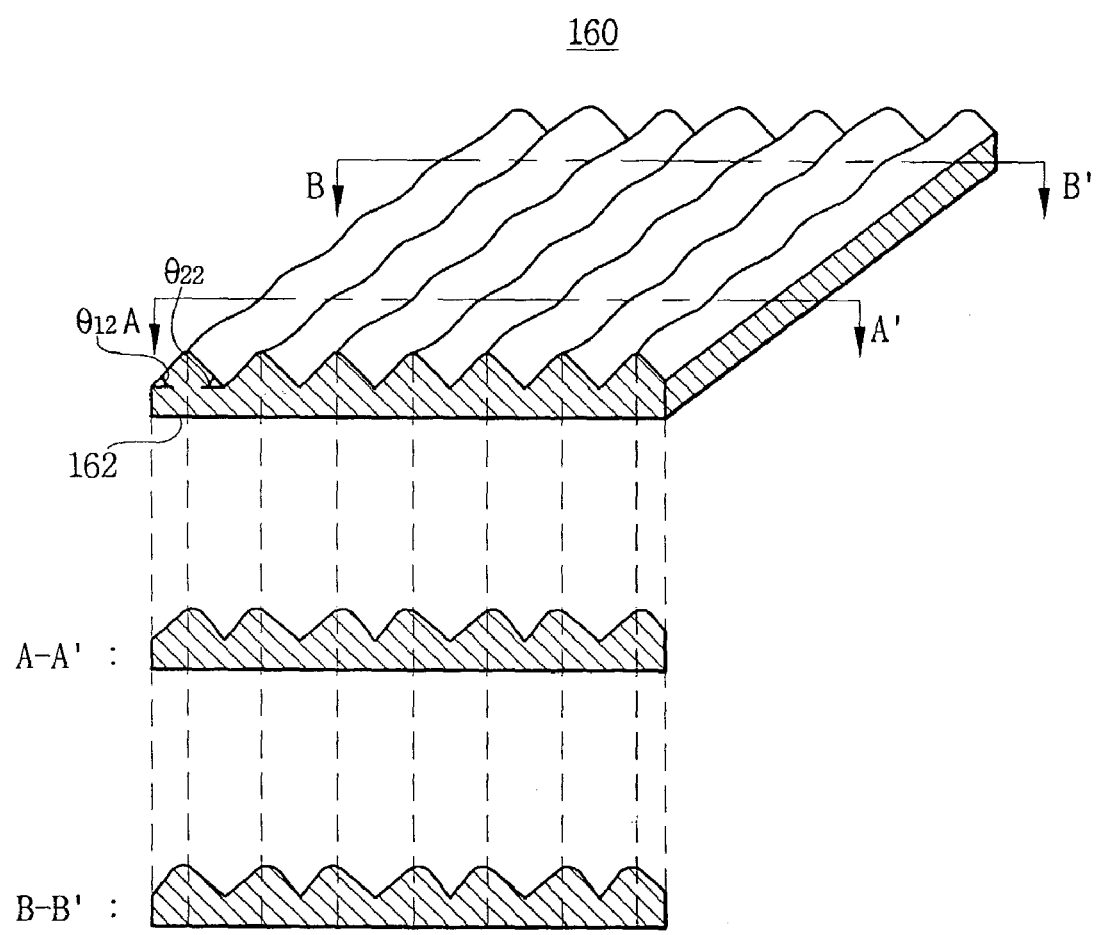
FIG. 4 is a schematic view showing the second prism sheet of FIG. 1.

FIG. 4 is a schematic view showing the second prism sheet of FIG. 1, especially shows a curved type prism sheet.

Referring to FIG. 4, the curved type prism sheet 160 has a plurality of triangular prisms formed on a second transparent film 162 having a predetermined thickness, and each of the triangular prisms includes a round-treated apex. In this embodiment, the triangular prisms have the same lowest height (e.g., the height from the bottom of the second transparent film 162 to a furrow between adjacent prisms) and the same highest height (e.g., the height from the bottom of the second transparent film 162 to the apex of a prism), but a first oblique angle ($\theta 12$) between a bottom surface of the film 162 and a first oblique face, is different from a second oblique angle between the bottom surface of the film 162 and a second oblique face.

According to one exemplary embodiment of the present invention, there may be provided a prism sheet including a plurality of triangular prisms each of which has a bottom face, a first oblique face and a second oblique face. The highest apexes respectively formed by the first oblique faces and the second oblique faces are the same in height each other. The ridge of an apex of each prism is formed in the shape of a curved line. The furrows each between adjacent triangular prisms also have the same height, and each furrow is formed in the shape of a straight line. When the curved type prism sheet 160 having the aforementioned structure is viewed from the top, a ridge line of the respective apexes of the triangular prisms is a curved line, and a line of the respective furrows of the triangular prisms is a straight line.

According to one exemplary embodiment of the present invention, there may be provided a prism sheet including a plurality of triangular prisms each of which has a bottom face, a first oblique face and a second oblique face. The apexes respectively formed by the first oblique faces and the second oblique faces have the same height, and the line of the respective apexes is straight. The furrows each between adjacent triangular prisms have the same height, and the line of each furrow is curved. When the curved type prism sheet having the aforementioned structure is viewed from the top, the ridge line constituting the apexes of the triangular prisms is a straight line, and the line constituting the furrows of the triangular prisms is also a straight line.

As described previously, the anti-glare polarizing plate that is treated to have a predetermined haze value is arranged on a rear surface of the lower substrate, thereby preventing occurrence of optical interference phenomenon. Preferably, the test for the LCD panel assembly having the aforementioned anti-glare polarizing plate is completed before the anti-glare polarizing plate is attached to the LCD panel assembly because the laser is not exactly focused on repairing portion to be tested through the anti-glare polarizing plate during the repair process of the LCD device.

Since the anti-glare polarizing plate is generally treated to have a predetermined haze value, the replacement of the glare polarizing plate with the anti-glare polarizing plate causes the brightness to be lowered by 3% or so. In addition, the round-treated prism sheet that is not treated with matte provides an enhanced brightness by 9% compared with the round-treated prism sheet treated with matte. The matte treatment represents that the rear surface of the prism sheet, e.g., the surface where the triangular prisms are not formed, is coated with beads each having a diameter range of about 4.5 μm to about 5.5 μm, preferably, approximately 5 μm.

Accordingly, compared with a structure where a glare polarizing plate is arranged at the bottom of the LCD panel assembly and a round-treated and matte-treated prism sheet is arranged at the top of the backlight assembly, the brightness increases by 6% or more in the structure where an anti-glare polarizing plate that is treated to have a predetermined haze value is arranged at the bottom of the LCD panel assembly and a round-treated but non-matte-treated prism sheet is arranged at the top of the backlight assembly.

Hereinafter, the aforementioned brightness enhancement effect is described through the embodiments of the present invention and the comparative examples.

For the comparison of the brightness characteristics between the embodiments and the comparative examples, the comparative example employed an LCD device having an upper prism sheet that was matte-treated and round-treated and a lower polarizing plate arranged on the upper prism sheet and glare-treated, and the example of the invention employed an LCD device having the upper prism sheet non-matte-treated and round-treated and an anti-glare polarizing plate arranged on the upper prism sheet. The anti-glare polarizing plate according to the present invention was treated to have a haze value ranged from about 12% to about 44%, preferably, to have a haze value of 25%.

Figure 5B:
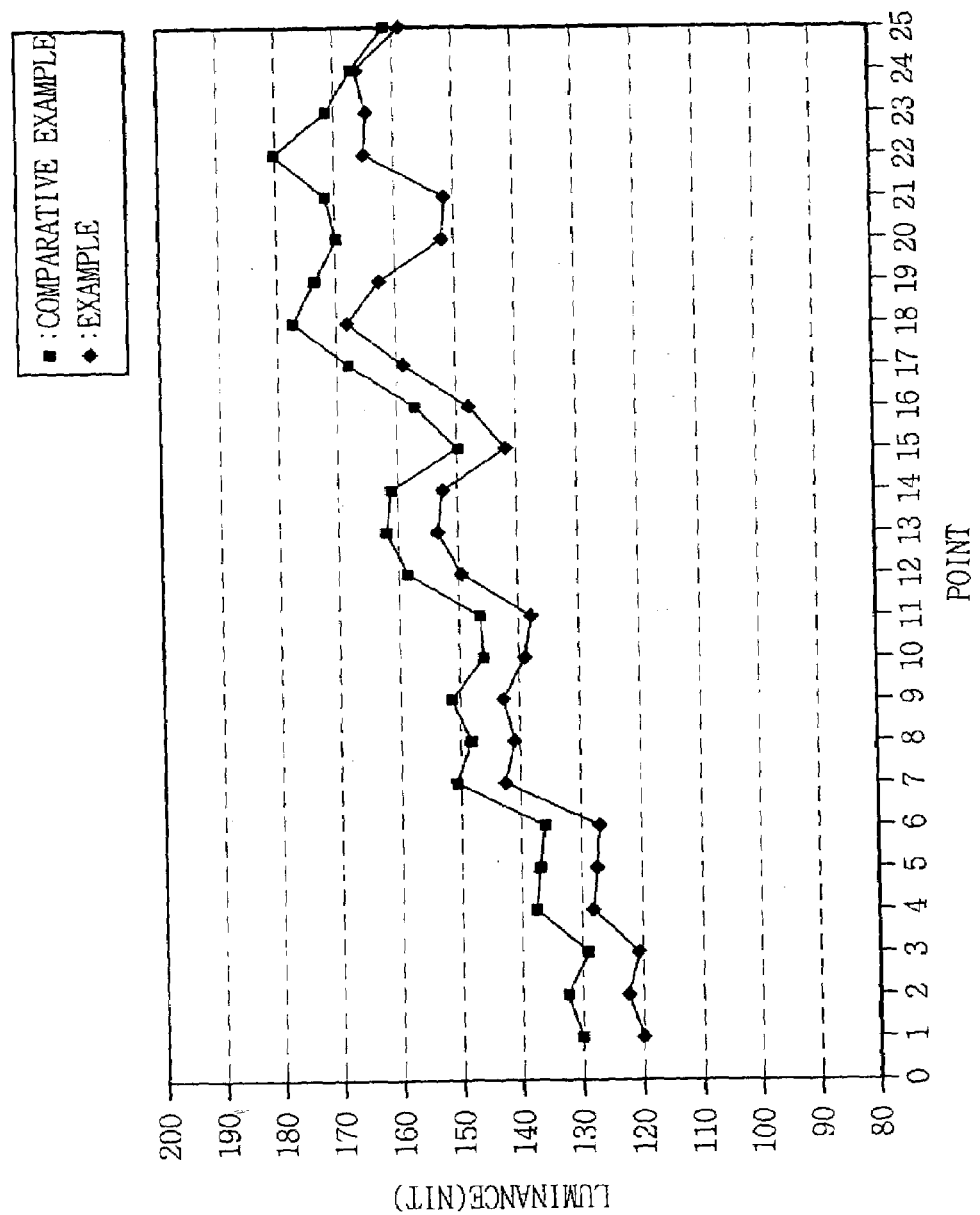
FIG. 5B is a graph showing a brightness distribution characteristic when using a first combination of a general prism sheet and a polarizing plate and another brightness distribution characteristic when using a second combination of a prism sheet of the present invention and the polarizing plate.

FIG. 5A is a schematic view showing an effective display screen of a liquid crystal display device, and FIG. 5B is a graph showing a brightness distribution characteristic when using a first combination of a general prism sheet and a polarizing plate and another brightness distribution characteristic when using a second combination of a prism sheet of the present invention and the polarizing plate.

Referring to FIG. 5A, for example, five points were selected in the longitudinal direction and five points in the lateral direction 25, so that 25 detection points were selected on the effective display area of the LCD panel.

The following table 1 shows the evaluation result of the brightness characteristics measured on the 25 detection points in the LCD device according to the example of the invention and the LCD device according to the comparative example.

TABLE 1

| | Brightness [nit] | |
|---|---|---|
| Point | Comparative Example | Example of the Invention |
| 1 | 119.8 | 129.1 |
| 2 | 123.1 | 132.3 |
| 3 | 120.0 | 128.2 |
| 4 | 127.3 | 136.3 |
| 5 | 127.6 | 136.5 |
| 6 | 126.9 | 135.8 |
| 7 | 141.5 | 151.0 |
| 8 | 140.0 | 147.1 |
| 9 | 143.0 | 151.7 |
| 10 | 137.9 | 145.3 |
| 11 | 135.8 | 146.8 |
| 12 | 149.1 | 158.2 |
| 13 | 153.8 | 163.0 |
| 14 | 152.5 | 162.0 |
| 15 | 141.1 | 149.5 |
| 16 | 145.9 | 156.8 |
| 17 | 158.7 | 167.4 |
| 18 | 166.9 | 176.5 |
| 19 | 163.1 | 172.7 |
| 20 | 151.6 | 159.7 |
| 21 | 151.0 | 161.8 |
| 22 | 165.2 | 179.9 |
| 23 | 163.1 | 171.8 |
| 24 | 165.6 | 166.7 |
| 25 | 158.9 | 161.9 |

As shown in table 1, the brightness evaluation results measured on all the points show that the brightness in the example of the present invention is higher than that in the comparative examples.

Generally, the brightness in the central portion of the effective display region was more sensitive to a viewer than that in other portions of the effective display region. Considering the above fact, an average brightness of the five points 7, 9, 13, 17 and 19 in the comparative example was 152.02 [nit], and an average brightness of the five points 7, 9, 13, 17 and 19 in the example of the invention was 161.16 [nit]. From the average brightness obtained from the five points, it can be noted that the average brightness in the example of the invention was increased by 6.02%.

In addition, an average brightness of the 25 points in the comparative example was 145.176 [nit], and an average brightness of the 25 points in the invention is 153.92 [nit]. From the average brightness obtained from the 25 points, it can be concluded that the average brightness in the example of the invention was increased by 6.01%.

The brightness evaluation values of the table 1 are plotted in FIG. 4B.

While the exemplary embodiments of the present invention and its advantages have been described in detail, it should be understood that various changes, substitutions and alterations can be made herein without departing from the spirit and scope of the invention as defined by appended claims.

What is claimed is:

1. A liquid crystal display device comprising:
   a backlight assembly comprising a light path regulating means including a first prism sheet, and the first prism sheet concentrating a first light supplied from an internal light source, regulating a light path of the first light and outputting a second light, the first prism sheet having a plurality of first triangular prisms formed on a first transparent film, an apex of each of the first triangular prisms having a round shape; and
   a liquid crystal display panel assembly including an anti-glare polarizing plate for uniformly polarizing a polarized plane of the second light, and the liquid crystal display panel assembly displaying an image based on the second light,
   wherein the first triangular prisms form a plurality of 'V' shaped grooves and each of the first triangular prisms has a bottom surface, a first oblique face and a second oblique face, apexes each of which is formed by the first oblique face and the second oblique face has a substantially same height, a ridge of each apex extends along a longitudinal direction of each triangular prism and has a shape of a curved line.

2. The liquid crystal display device of claim 1, wherein the liquid crystal display panel assembly further includes i) an upper substrate, ii) a lower substrate facing the upper substrate, iii) a liquid crystal layer interposed between the upper and lower substrates, and the anti-glare polarizing plate is arranged on a rear surface of the lower substrate and provides the lower substrate with the polarized second light.

3. The liquid crystal display device of claim 2, wherein a front face of the anti-glare polarizing plate faces the lower substrate, and a rear face of the anti-glare polarizing plate is treated to have a haze value in a range from about 12% to about 44%.

4. The liquid crystal display device of claim 1, wherein the light path regulating means further includes a second prism sheet having a plurality of second prisms formed on a second transparent film, the second prism sheet being disposed below the first prism sheet and concentrating the first light supplied from the lamp to provide the first prism sheet with concentrated light.

5. The liquid crystal display device of claim 1, wherein the backlight assembly further comprises a light guiding plate and a diffusion member formed on a face of the light guiding plate so as to be opposite to the liquid crystal display panel assembly, the light guiding plate receives the first light from the lamp, guides the light path of the first light diffuses the guided light by the diffusion member, and outputs the diffused light to the LCD panel assembly.

6. The liquid crystal display device of claim 1, wherein only the apex of each of the first triangular prisms is rounded.

7. The liquid crystal display device of claim 1, wherein a ridge of the apex of each of the first triangular prisms is formed in a shape of a curved line.

8. A liquid crystal display device comprising:
   a backlight assembly comprising i) a lamp for generating a first light, and ii) a light path regulating means including a first prism sheet having a plurality of first triangular prisms formed on a first transparent film, an apex of each of the first triangular prisms having a round shape, and the first prism sheet concentrating the first light supplied from the lamp, regulating a light path of the first light and outputting a second light; and
   a liquid crystal display panel assembly including i) an upper substrate, ii) a lower substrate facing the upper substrate, iii) a liquid crystal layer interposed between the upper and lower substrates, and iv) an anti-glare polarizing plate, arranged on a rear surface of the lower substrate, for uniformly polarizing a polarized plane of the second light to provide the lower substrate with the polarized second light, and the liquid crystal display panel assembly displaying an image based on the second light,
   wherein the first triangular prisms form a plurality of 'V' shaped grooves and each of the first triangular prisms has a bottom surface, first oblique face a second oblique face, apexes each of which is formed by the first oblique face and the second oblique face and have a substantially same height, a ridge of each apex extends along a longitudinal direction of each triangular prism and has a shape of a curved line.

9. The liquid crystal display device of claim 8, wherein a front face of the anti-glare polarizing plate faces the lower substrate, and a rear face of the anti-glare polarizing plate is treated to have a predetermined haze value.

10. The liquid crystal display device of claim 9, wherein the haze value is in a range from about 12% to about 44%.

11. The liquid crystal display device of claim 8, wherein the light path regulating means further comprises a second prism sheet including a plurality of second prisms formed on a second transparent film, the second prism sheet being disposed below the first prism sheet and concentrating the first light supplied from the lamp to provide the first prism sheet with the concentrated light.

12. The liquid crystal display device of claim 8, wherein the second prism sheet is non-matte-treated.

13. The liquid crystal display device of claim 8, wherein the backlight assembly further comprises a diffusion sheet for diffusing the first light supplied from the lamp to output the diffused light to the first prism sheet.

14. The liquid crystal display device of claim 8, wherein the backlight assembly further comprises a light guiding plate and a diffusion member formed on a face of the light guiding plate so as to be opposite to the liquid crystal display panel assembly, the light guiding plate receives the first light from the lamp, guides the light path of the first light, diffuses the guided light by the diffusion member, and outputs the diffused light to the LCD panel assembly.

15. The liquid crystal display device of claim 8, wherein liquid crystal display device further comprises a second prism sheet disposed below the first prism sheet, the second prism sheet is a linear type prism sheet for concentrating the diffused light in a second direction that is different from the first direction.

16. The liquid crystal display device of claim 8, wherein the backlight assembly further includes:
   a light guiding plate for guiding the light path of the first light generated from the lamp and for outputting the guided light; and
   a diffusion sheet, disposed over the light guiding plate, for diffusing the guided light guided by the light guiding plate.

17. The liquid crystal display device of claim 8, wherein only the apex of each of the first triangular prisms is rounded.

18. The liquid crystal display device of claim 8, wherein a ridge of the apex of each of the first triangular prisms is formed in a shape of a curved line.

* * * * *